United States Patent
Thiesson et al.

(10) Patent No.: US 7,133,811 B2
(45) Date of Patent: Nov. 7, 2006

(54) STAGED MIXTURE MODELING (75) Inventors: Bo Thiesson, Woodinville, WA (US); Christopher A. Meek, Kirkland, WA (US); David E. Heckerman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 808 days.

(21) Appl. No.: 10/270,914

(22) Filed: Oct. 15, 2002

(65) Prior Publication Data

US 2004/0073537 A1 Apr. 15, 2004

(51) Int. Cl.
*G06F 17/10* (2006.01)

(52) U.S. Cl. ............... 703/2; 707/200; 707/101; 707/6; 707/5; 706/52; 702/19

(58) Field of Classification Search ............... 703/2; 707/6, 5, 7, 101, 3, 100; 706/52, 48; 702/19; 345/767; 435/6, 7.1; 704/236; 705/10; 715/811; 382/187
See application file for complete search history.

(56) References Cited

U.S. PATENT DOCUMENTS

| | | | |
|---|---|---|---|
| 6,263,334 B1 * | 7/2001 | Fayyad et al. ............... 707/5 |
| 6,263,337 B1 * | 7/2001 | Fayyad et al. ............... 707/6 |
| 6,336,108 B1 | 1/2002 | Thiesson et al. |
| 6,345,265 B1 | 2/2002 | Thiesson et al. |
| 6,374,251 B1 * | 4/2002 | Fayyad et al. ............... 707/101 |
| 6,408,290 B1 * | 6/2002 | Thiesson et al. ............... 706/52 |
| 6,449,612 B1 * | 9/2002 | Bradley et al. ............... 707/6 |
| 6,496,816 B1 | 12/2002 | Thiesson et al. |
| 6,529,891 B1 | 3/2003 | Thiesson et al. |
| 6,581,058 B1 * | 6/2003 | Fayyad et al. ............... 707/6 |
| 6,591,235 B1 * | 7/2003 | Chen et al. ............... 704/236 |
| 6,633,882 B1 * | 10/2003 | Fayyad et al. ............... 707/101 |
| 6,807,537 B1 | 10/2004 | Thiesson et al. |
| 6,862,574 B1 * | 3/2005 | Srikant et al. ............... 705/10 |
| 6,964,023 B1 * | 11/2005 | Maes et al. ............... 715/811 |
| 7,003,158 B1 * | 2/2006 | Bennett et al. ............... 382/187 |
| 2002/0107853 A1 * | 8/2002 | Hofmann et al. ............... 707/7 |
| 2002/0129038 A1 * | 9/2002 | Cunningham ............... 707/200 |
| 2002/0135618 A1 * | 9/2002 | Maes et al. ............... 345/767 |
| 2002/0138492 A1 * | 9/2002 | Kil ............... 707/100 |
| 2003/0014399 A1 * | 1/2003 | Hansen et al. ............... 707/3 |
| 2003/0065635 A1 * | 4/2003 | Sahami et al. ............... 706/48 |
| 2003/0100998 A2 * | 5/2003 | Brunner et al. ............... 702/19 |
| 2004/0009489 A1 * | 1/2004 | Golub et al. ............... 435/6 |

(Continued)

OTHER PUBLICATIONS

Beaufays et al., "Discriminative mixture weight estimation for large Gaussian mixture models", IEEE, 1999.*

(Continued)

*Primary Examiner*—Kandasamy Thangavelu
(74) *Attorney, Agent, or Firm*—Amin & Turocy, LLP (57) ABSTRACT

A system and method for generating staged mixture model(s) is provided. The staged mixture model includes a plurality of mixture components each having an associated mixture weight, and, an added mixture component having an initial structure, parameters and associated mixture weight. The added mixture component is modified based, at least in part, upon a case that is undesirably addressed by the plurality of mixture components using a structural expectation maximization (SEM) algorithm to modify at the structure, parameters and/or associated mixture weight of the added mixture component.

The staged mixture model employs a data-driven staged mixture modeling technique, for example, for building density, regression, and classification model(s). The basic approach is to add mixture component(s) (e.g., sequentially) to the staged mixture model using an SEM algorithm.

35 Claims, 6 Drawing Sheets

U.S. PATENT DOCUMENTS

| | | | |
|---|---|---|---|
| 2004/0010497 A1* | 1/2004 | Bradley et al. | 707/100 |
| 2004/0117367 A1* | 6/2004 | Smith et al. | 707/5 |
| 2005/0089923 A9* | 4/2005 | Levinson et al. | 435/7.1 |

OTHER PUBLICATIONS

Yingjian et al., "A global learning method for RBFN", IEEE, Aug. 2002.*

Beeferman et al., "A model of lexical attraction and repulsion.", ACM, Jul. 1997.*

Perira et al., "An efficient extension to mixture techniques for prediction and decision trees", ACM 1997.*

Ordonez et al., "SQLEM: fast clustering in SQL using EM algorithm", ACM 2000.*

Jonathan Q. Li, et al.; "Mixture Density Estimation"; In S.A. Solla, T.K. Leen, and K.R. Muller, Editors, Advances in Neural Information Processing Systems 12, pp. 279-285. MIT Press, 2000.

Bo Thiesson, et al.; "Learning Mixtures of DAG Models"; Dec. 1997 (Revised May 1998); Technical Report MSR-TR-97-30; pp. 1-28.

Nir Friedman; "The Bayesian Structural EM Algorithm", 1998.

David Maxwell Chickering, David Heckerman and Christopher Meek, A Bayesian approach to learning Bayesian networks with local structure, Technical Report: MSR-TR-97-07, Aug. 1997, pp. 1-19.

David Maxwell Chickering, Christopher Meek and Robert Rounthwaite, Efficient Determination of Dynamic Split Points in a Decision Tree, IEEE Computer Society, 2001, 8 Pages.

Yoav Freund and Robert E. Schapire, A decision-theoretic generalization of on-line learning and an application to boosting*, Journal of Computer and System Sciences, Dec. 19, 1996, 35 Pages.

Jerome H. Friedman, Greedy Function Approximation: A Gradient Boosting Machine, Technical Report, Department of Statistics, Stanford University, 1999, 34 Pages.

Jerome Friedman, Trevor Hastie and Robert Tibshirani, Additive Logistic Regression: a Statistical View of Boosting, Technical Report, Department of Statistics, Stanford University, Aug. 17, 1998, 44 Pages.

Nir Friedman, Learning Belief Networks in the Presence of Missing Values and Hidden Variables, 9 Pages.

D. Greiger, D. Heckerman, H. King and C. Meek, Stratified Exponential Families: Graphical Models and Model Selection, Technical Report: MSR-TR-98-31, Jul. 1998, 30 Pages.

Geoffrey E. Hinton, Peter Dayan and Michael Revow, Modelling the Manifolds of Images of Handwritten Digits, IEEE Transactions on Neutral Networks,1997, 29 Pages.

X. Huang, A. Acero, F. Alleva, M. Hwang, L. Jiang and M. Mahajan, Microsoft Windows Highly Intelligent Speech Recognizer: Whisper, In IEEE International Conference on Acoustics, Speech, and Signal Processing, 1995, ICASSP-95, vol. 1, pp. 93-96.

C. Meek, D.M. Chickering and D. Heckerman, Autoregressive Tree Models for Time-Series Analysis, Proceedings of the Second International SIAM Conference on Data Mining, Arlington, VA. SIAM, 16 Pages.

M. Meila and M. Jordan, Learning with Mixtures of Trees, Journal of Machine Learning Research 1, 2000: pp. 1-48.

B. Thiesson, C. Meek, D.M. Chickering and D. Heckerman, Computationally Efficient Methods for Selecting Among Mixtures of Graphical Models, Bayesian Statistics 6: Proceedings of the Sixth Valencia International Meeting, Clarendon Press, Oxford, 18 Pages.

Christopher Meek, Bo Thiesson and David Heckerman, Staged Mixture Modeling and Boosting, Technical Report: MSR-TR-2002-45, Feb. 2002, 12 Pages.

* cited by examiner

STAGED MIXTURE MODELING

TECHNICAL FIELD

The present invention relates generally to mixture models, and, more particularly to a system and method for learning mixture models using a structural expectation maximization algorithm.

BACKGROUND OF THE INVENTION

Mixture model(s) are used, for example, to build and/or improve data mining models for density, regression and/or classification model(s). Statisticians and computer scientists have used these models for statistical inference or learning from data. In particular, model selection and model averaging techniques have been applied to models for the purposes of prediction and identifying cause and effect from observational data. The basic idea behind these endeavors has been that many domains exhibit conditional independence (e.g., due to causal relationships) and mixture models are useful for capturing these relationships.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a staged mixture model having a plurality of mixture components each having an associated mixture weight, and, an added mixture component having an initial structure, parameters and associated mixture weight, the added mixture component modified based, at least in part, upon a case that is undesirably addressed by the plurality of mixture components using a structural expectation maximization (SEM) algorithm to modify the structure, parameters and/or associated mixture weight of the added mixture component. An SEM algorithm is an expectation maximization (EM) type algorithm which interleaves a structure and a parameter search.

The staged mixture model employs a data-driven staged mixture modeling technique, for example, for building density, regression, and classification model(s). The basic approach is to add mixture component(s) (e.g., sequentially) to the staged mixture model using an SEM algorithm.

More specifically, in one example, at each stage, the added mixture component (e.g., a pre-specified initial mixture component) is added to the staged mixture model with a pre-specified initial associated mixture weight while fixing the previous component structures, parameters, and relative mixture weights. The SEM algorithm is then employed to modify the added mixture component and initial associated mixture weight in the staged mixture model. The staged mixture model can be employed, for example, for improved prediction algorithm(s) for data mining, density estimation model(s), regression model(s), and/or classification model(s).

Thus, the system and/or method of the present invention can be used to learn mixture models by sequentially adding components to the mixture model that will handle cases that are not well-handled by the previous components and in this way improve the performance of the model. The system and/or method can be applied to enhance a given single-component learning method that can learn from fractionally weighted data and in this way build up a staged mixture model. Further, the system and/or method facilitates improvement of performance of density models as well as regression and classification models. Additionally, the system and/or method provide a principled means of optimizing both the weights for the component models and the structure of the component models. The added mixture component and its associated mixture weight can facilitate fitting of the staged mixture model to case(s) that are undesirably addressed by existing mixture components.

In one example, three items are identified: an initial value for the associated weight of the added mixture component (e.g., $n^{th}$ component), (2) initial structure and parameters (e.g., estimate and/or guess) for the added mixture component, and (3) the component mixture model obtained in a previous stage of the staged mixture model.

The procedure for adding a component to the mixture model makes use of two routines: (1) a weighted-data learning method; a method that can be applied to (fractionally) weighted data in order to produce a probabilistic model and (2) a model score method that evaluates the fit of a probabilistic model to a weighted data set. For example, a mixture component with an initial structure, parameters and associated mixture weight can be added to the mixture model. The structure and/or parameter of the added mixture component can be modified based, at least in part, upon a fractionally weighted-data learning method and model score. Further, the associated mixture weight of the added mixture component can be optimized.

Another aspect of the present invention provides for a staged mixture model generation system. The system includes a mixture model, an initial added mixture component provider and a mixture component modifier. The mixture model includes a plurality of mixture components.

More specifically, in one example, at each stage, an added mixture component is provided by the initial added mixture component provider to the mixture component modifier. The added mixture component has a pre-specified initial structure, parameters and associated mixture weight.

In one example, the mixture component modifier can fix the previous component structures, parameters, and relative mixture weights and employ an SEM algorithm to modify the added component and associated mixture weight. Addition and/or modification of the added mixture component and its associated mixture weight can facilitate fitting of the mixture model to case(s) that are undesirably addressed by mixture components of the mixture model. The mixture component modifier can modify the mixture model based, at least in part, upon the added mixture component, the associated mixture weight of the added mixture component and a previous mixture model.

In another example, the previous mixture components and/or associated mixture weights are not fixed—thus facilitating backfitting of the previous mixture components and/or associated mixture weights. The mixture component modifier includes a structural/parameter modifier and/or a weight modifier.

The structural/parameter modifier can modify the structure and/or parameter of the added mixture component provided by the initial added mixture component provider. The structural/parameter modifier can compute a weighted data set for the added mixture component. The structural/parameter modifier can use the weighted data set and a fractionally weighted-data learning method to learn a potential added mixture component. The structural/parameter modifier can then calculate a model score using the potential added component on the weighted data. If the model score using the potential added component improves over the model score using the added component on complete data, the added component can be modified based, at least in part, upon the potential added component. The mixture model can then be modified based, at least in part, upon the added mixture component, the associated mixture weight of the added component and the previous mixture model. The structural/parameter modifier can iteratively perform structural/parameter modification a predetermined number of times (e.g., based on a first schedule parameter ($S_1$)) and/or until a first stopping criteria has been met.

The weight modifier can modify the associated weight of the added mixture component. The weight modifier can compute a weighted data set for the added mixture component using the staged mixture model. The weight modifier can perform a maximization step to obtain a potential associated weight for the added mixture component. The weight modifier can calculate the mixture model using the potential associated weight for the added mixture component. If the model score improves with the potential associated weight for the added mixture component (e.g., on original data) over a model score for the previous staged mixture model (e.g., on original data), the associated weight mixture for the added mixture component can be modified based on the potential associated weight. Further, the mixture model can be modified based, at least in part, upon the added mixture component, the associated mixture weight of the added component and the previous staged mixture model. The weight modifier can iteratively perform weight modification a predetermined number of times (e.g., based on a second schedule parameter ($S_2$)) and/or until a second stopping criteria has been met.

The mixture component modifier can iteratively perform structural/parameter modification and weight modification a predetermined number of times (e.g., based on a third schedule parameter ($S_3$)) and/or until a third stopping criteria has been met.

Yet other aspects of the present invention provides for previous mixture components to be backfitted by the structural/parameter modifier and/or associated mixture weights to be backfitted by the weight modifier.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Figure 1:
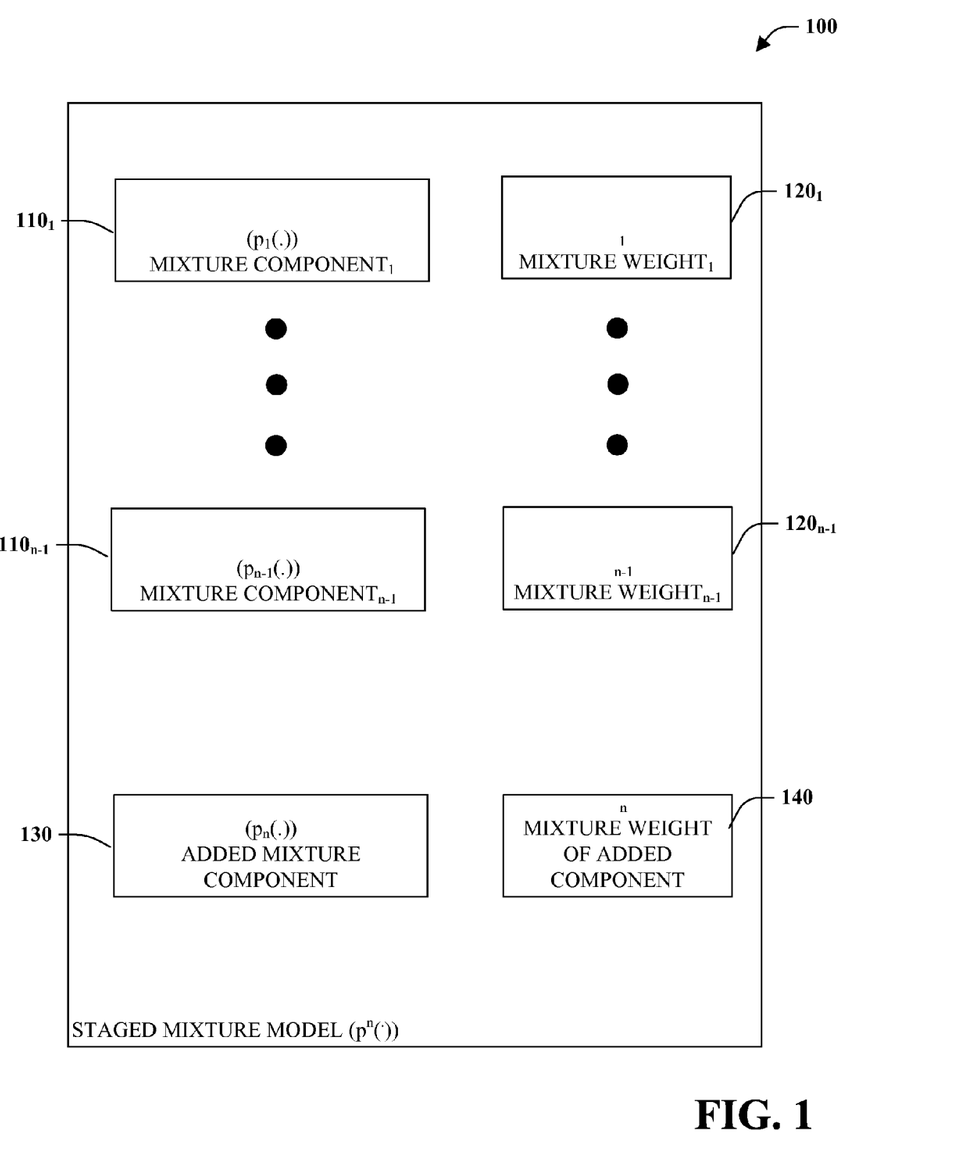
FIG. 1 is a block diagram of a staged mixture model in accordance with an aspect of the present invention.

Referring to FIG. 1, a staged mixture model 100 in accordance with an aspect of the present invention is illustrated. The staged mixture model 100 includes a first mixture component $110_1$ through an n–$1^{th}$ mixture component $110_{n-1}$, n being an integer greater than or equal to two. The first mixture component $110_1$ through the n–$1^{th}$ mixture component $110_{n-1}$ can be referred to collectively as the mixture component(s) 110. Each of the mixture component(s) 110 has an associated mixture weight $120_1$ through $120_{n-1}$ ($\pi_1$ through $\pi_{n-1}$). The staged mixture model 100 further includes an added mixture component 130 having an associated mixture weight 140. In one example, the mixture component(s) 110 include decision trees with a bounded number of leaves. In another example, the mixture component(s) 110 include Bayesian networks whose local distributions are regression trees with a bounded number of leaves. In yet a third example, the mixture component(s) 110 include decision trees.

The staged mixture model 100 employs a data-driven staged mixture modeling technique, for example, for building density, regression, and classification model(s). The basic approach is to add mixture component(s) (e.g., sequentially) to the staged mixture model 100 using a structural expectation maximization (SEM) algorithm.

More specifically, in one example, at each stage, the added mixture component 130 (e.g., a pre-specified initial mixture component) is added to the staged mixture model 100 with a pre-specified initial associated mixture weight 140 while fixing the previous component structures, parameters, and relative mixture weights. The SEM algorithm is then employed to modify the added mixture component 130 and initial associated mixture weight 140 in the staged mixture model 100 (e.g., using a criterion such as the Bayesian Information Criterion (BIC)). The staged mixture model 100 can be employed, for example, for improved prediction algorithm(s) for data mining, density estimation model(s), regression model(s), and/or classification model(s).

An SEM algorithm is an expectation maximization (EM) type algorithm which interleaves a structure and a parameter search. Thus, computation of expected sufficient statistics for potential component models is interleaved with structure and parameter search.

Each iteration in the EM algorithm consists of an expectation step (or E-step) and a maximization step (or M-step). For each iteration, the algorithm gradually improves the parameterization until convergence. The EM algorithm may perform as many EM iterations as necessary (e.g., to substantial convergence). For additional details concerning EM algorithms in general, reference may be made to Dempster et al., Maximum Likelihood from Incomplete Data via the EM Algorithm, Journal of the Royal Statistical Society, Series B, 39, 1–38 (1977).

In order to explain the present invention, the following syntactic conventions will be employed. A variable is denoted by an upper case token (e.g., A, $B_i$, Y) and a state or value of that variable is denoted by the same token in lower case (e.g., a, $b_i$, y). Further, sets will be denoted with bold-face capitalized tokens (e.g., A, X) and corresponding sets of values by bold-face lower case tokens (e.g., a, x).

Generally, an n-component mixture model is a model of the form:

$$p^n(Y \mid X, \theta) = \sum_{i=1}^{n} p(C = i \mid \theta_0) p_i(Y \mid C = i, X, \theta_i) \quad (1)$$

where n is the number of components, θ are parameters, $p(C=i|\theta)$ is a mixture weight of an $i^{th}$ component, and $p_i(Y|C=i, X, \theta_i)$ is the $i^{th}$ component. For purposes of brevity, $p^n(\cdot)$ or $p^n(Y|X)$ will be used to denote an n-component mixture model, $p_i(\cdot)$ or $p_i(Y|X)$ will denote the $i^{th}$ component model and $\pi_i$ will denote the $i^{th}$ component's mixture weight. Special cases of interest are density models, in which X is empty, regression model(s), in which Y is a single continuous-valued variable, and/or classification model(s), in which Y is a single discrete-valued variable.

A fractionally weighted data set for a set of variables is employed in accordance with an aspect of the present invention. A data set d={$z_1, \ldots, Z_N$} for a set of variables Z=X∪Y is a set of cases $z_i$(i=1, . . . , N) where $z_i$ is a value for Z. A weighted case $wc_i$={$z_i, w_i$} for a set of variables Z has a value $z_i$ for the variables Z and a real-valued weight $w_i$. A weighted data set for Z (denoted wd={$wc_1, \ldots, wc_N$}) is a set of weighted cases for Z. Weighted data for the $n^{th}$ component is obtained by associating a weight with each data case. The weight for case $x_i, y_i$ is computed as $$wc_i = \frac{\pi_n p_n(y_i \mid x_i)}{\pi_n p_n(y_i \mid x_i) + (1 - \pi_n) p^{n-1}(y_i \mid x_i)} \quad (2)$$

Referring back to FIG. 1, the staged mixture model 100 can be learned using a data-driven staged mixture modeling technique. In one example, the basic approach is to sequentially add component(s) (added mixture component 130) to the staged mixture model 100 using an SEM algorithm.

Addition of the added mixture component 130 and its associated mixture weight 140 can facilitate fitting of the staged mixture model 100 to case(s) that are undesirably addressed by the mixture model with mixture components 110 and mixture weights 120. Thus, the added mixture component 130 adds a new component to the staged mixture model 100.

In one example, three items are identified: (1) an initial value for the associated weight 140 ($\pi_n$) for the added mixture component 130 (e.g., $n^{th}$ component), (2) an initial value (e.g., estimate and/or guess) for the added mixture component 130 ($p_n(\cdot)$), and (3) the (n–1) component mixture model ($p^{n-1}(\cdot)$), for example, obtained in a previous stage of the staged mixture model 100.

The procedure for adding a component to the mixture model 100 can make use of two routines: (1) a fractionally weighted-data learning method; a method that can be applied to (fractionally) weighted data for X, Y in order to produce a probabilistic model p(Y|X) and (2) a model score method that evaluates the fit of a probabilistic model to a weighted data set for X, Y.

While FIG. 1 is a block diagram illustrating components for the staged mixture model 100, it is to be appreciated that the staged mixture model 100, the mixture components 110, the mixture weights 120, the added mixture component 130 and/or the mixture weight of the added component 140 can be implemented as one or more computer components, as that term is defined herein. Thus, it is to be appreciated that computer executable components operable to implement the staged mixture model 100, the mixture components 110, the mixture weights 120, the added mixture component 130 and/or the mixture weight of the added component 140 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 2:
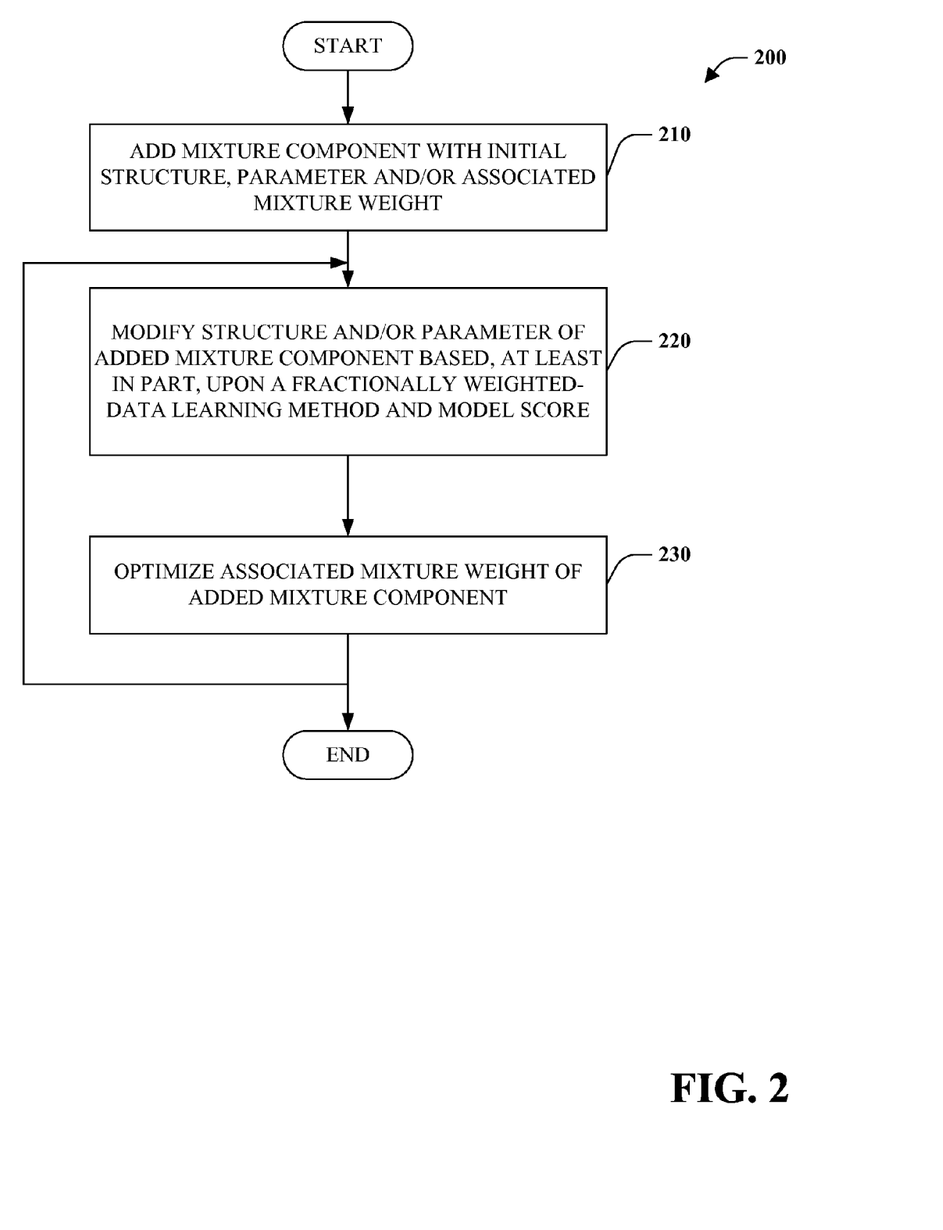
FIG. 2 is a flow chart illustrating a method for learning a staged mixture model a in accordance with an aspect of the present invention.
Figure 3:
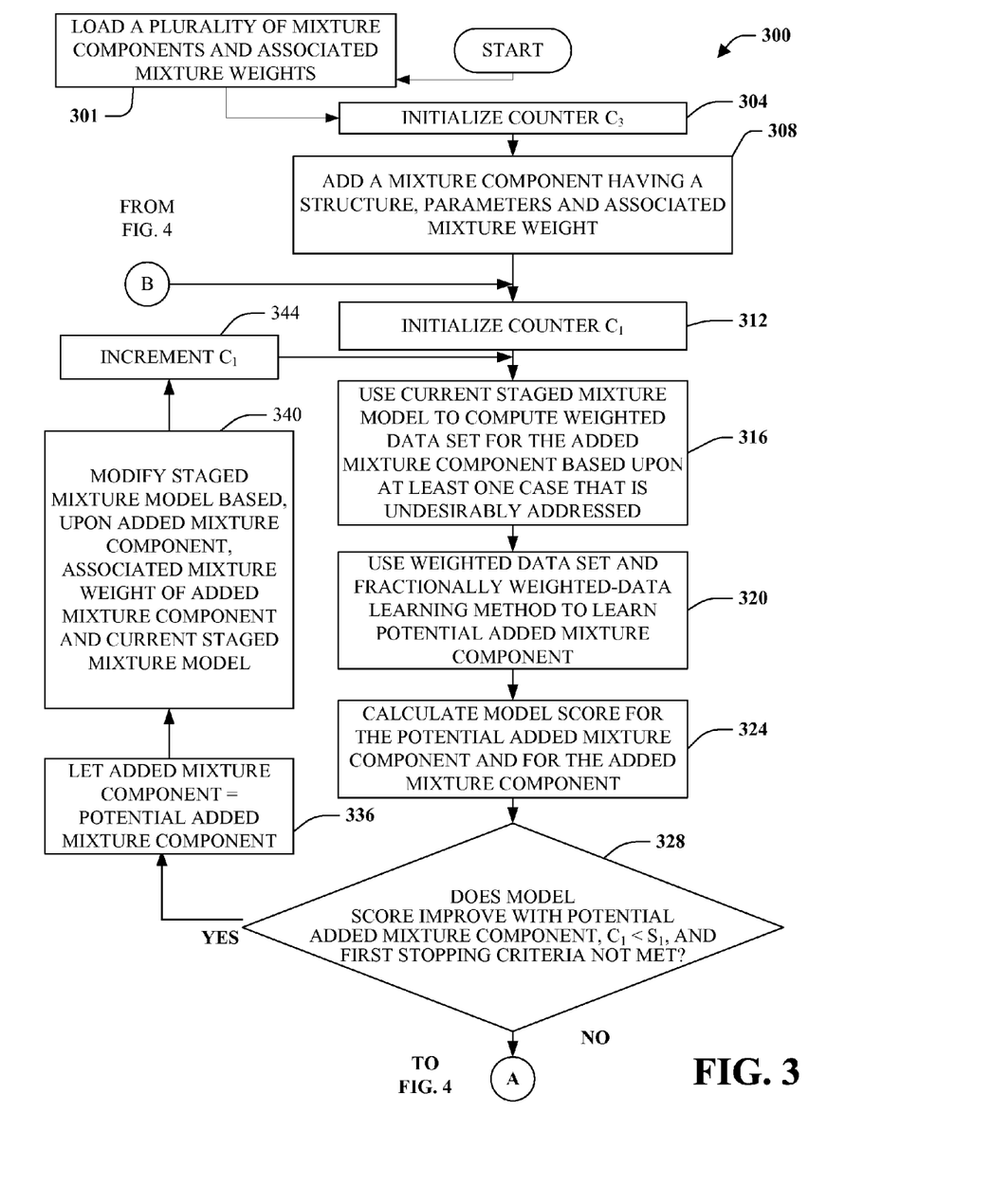
FIG. 3 is a flow chart illustrating a method for learning a staged mixture model in accordance with an aspect of the present invention.
Figure 4:
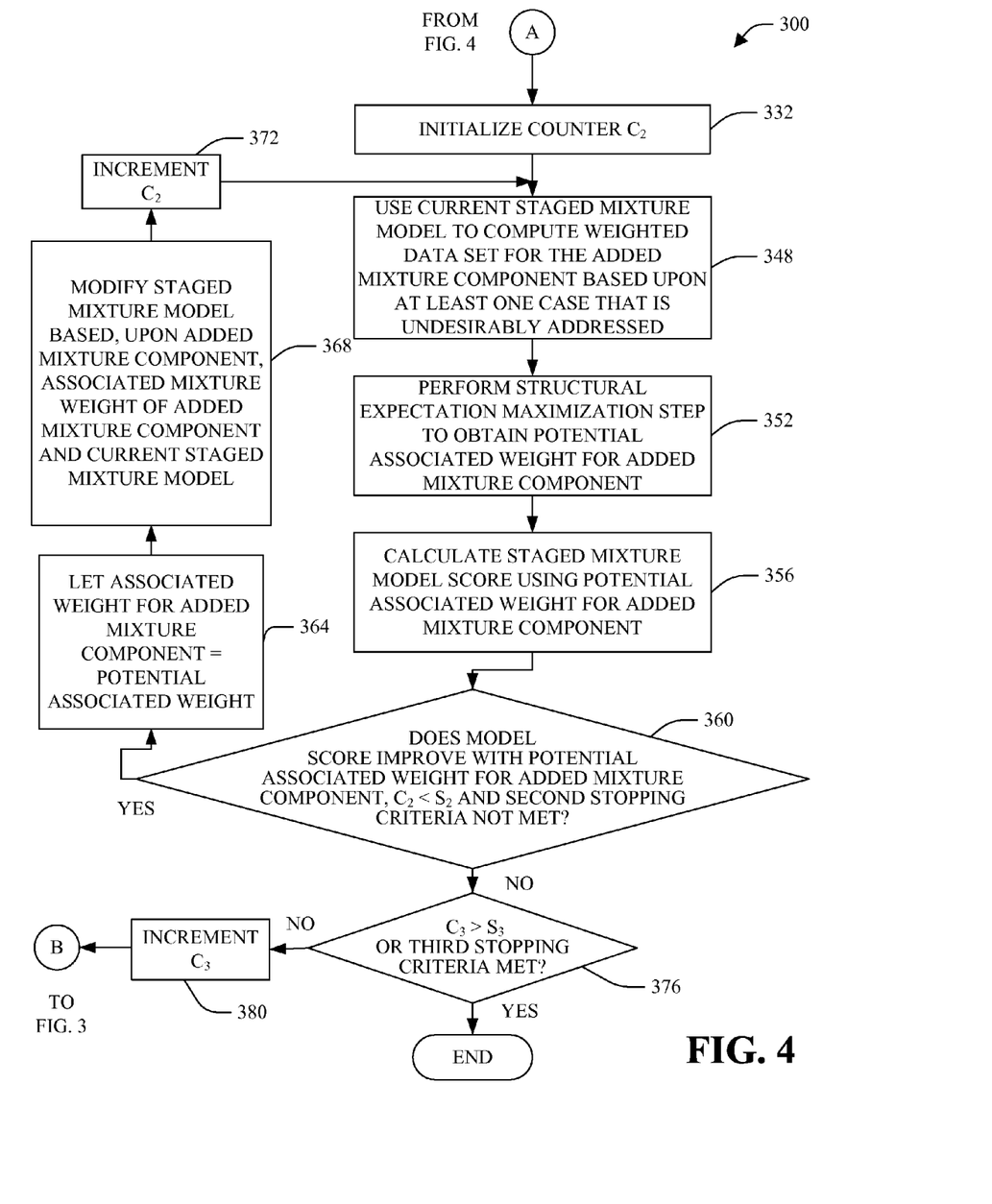
FIG. 4 is a flow chart further illustrating the method of FIG. 3.

Turning briefly to FIGS. 2, 3 and 4, methodologies that may be implemented in accordance with the present invention (e.g., staged mixture model 100) are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 2, a method 200 for learning a staged mixture model in accordance with an aspect of the present invention is illustrated. At 210, a mixture component with an initial structure, parameters and associated mixture weight is added to the mixture model (e.g., added mixture component 130 and associated mixture weight 140 are added to the mixture model 100). At 220, the structure and/or parameters of the added mixture component are modified based, at least in part, upon a fractionally weighted-data learning method and model score method. At 230, the associated mixture weight of the added mixture component is optimized (e.g., using a fractionally weighted-data learning method and/or a model score method). In one example, acts 210, 220 and 230 are performed sequentially for a plurality of added mixture components. In another example, acts 220 and 230 can be performed iteratively to facilitate component and weight optimization.

Turning to FIGS. 3 and 4, a method 300 for learning a staged mixture model $p''(\cdot)$ in accordance with an aspect of the present invention is illustrated. At 304, a third schedule counter $C_3$ is initialized (e.g., reset to zero). At 308, the staged mixture model $(p''(\cdot))$ is modified based, at least in part, upon an added mixture component $(p_n(\cdot))$ (e.g., having an initial structure and parameters), an associated mixture weight $(\pi_n)$ of the added mixture component and a previous staged mixture model $(p^{n-1}(\cdot))$. For example, the staged mixture model $(p''(\cdot))$ can be modified based on the following equation:

$$p''(\cdot)=\pi_n p_n(\cdot)+(1-\pi_n)p^{n-1}(\cdot) \qquad (3)$$

At 312, a first schedule counter $C_1$ is initialized (e.g., reset to zero). At 316, a weighted data set for the added mixture component is computed using the staged mixture model. At 320, a potential added mixture component $(p_n'(\cdot))$ is learned using the weighted data set and a fractionally weighted-data learning method. At 324, a model score using the potential added component $(p_n'(\cdot))$ on the weighted data is calculated (e.g., using a model score method).

At 328, a determination is made as to whether the model score using the potential added component $(p_n'(\cdot))$ on the weighted data set improves over the model score using the added component $(p_n(\cdot))$ on complete data, the first schedule counter $(C_1)$ is less than a first schedule parameter $(S_1)$ and a first stopping criteria has not been met. For example, the first stopping criteria can be based upon a difference between the model score for successive iterations (e.g., two) divided by the difference in model score at the current iteration and the initial model. If the value is below a specified value (e.g., by a user, for example $10^{-5}$), the first stopping criteria has been met. If the determination at 328 is NO, processing continues at 332. If the determination at 328 is YES, at 336, the added mixture component $(p_n(\cdot))$ is modified based on the potential added component $(p_n'(\cdot)$ e.g., $p_n(\cdot)=p_n'(\cdot))$. At 340, the staged mixture model $(p_n(\cdot))$ is modified based, at least in part, upon the added mixture component $(p_n(\cdot))$, the associated mixture weight of the added component $(\pi_n)$ and the previous staged mixture model $(p^{n-1}(\cdot))$. For example, modification of the staged mixture model $(p''(\cdot))$ can be based on the following:

$$p''(\cdot)=\pi_n p_n'(\cdot)+(1-\pi_n)p^{n-1}(\cdot) \qquad (4)$$

At 344, the first schedule counter $(C_1)$ is incremented and processing continues at 316. At 332, a second schedule counter $C_2$ is initialized (e.g., reset to zero). At 348, a weighted data set for the added mixture component $(p_n(\cdot))$ is computed using the staged mixture model $(p''(\cdot))$. At 352, a maximization step is performed to obtain a potential associated weight for the added mixture component $(\pi_n')$ (e.g., using the weighed data set). At 356, the staged mixture model is calculated using the potential associated weight for the added mixture component $(\pi_n')$ (e.g., using a model score method).

At 360, a determination is made whether the model score improves with the potential associated weight for the added mixture component $(\pi_n')$ (e.g., on original data) over a model score for the previous staged mixture model $(p^{n-1}(\cdot))$ (e.g., on original data), the second schedule counter $(C_2)$ is less than a second schedule parameter $(S_2)$ and a second stopping criteria has not been met. For example, the second stopping criteria can be based upon a difference between the model score for successive iterations (e.g., two) divided by the difference in model score at the current iteration and the initial model. If the value is below a specified value (e.g., by a user, for example $10^{-5}$), the second stopping criteria has been met. If the determination at 360 is YES, at 364, the associated weight mixture for the added mixture component $(\pi_n)$ is modified based on the potential associated weight $(\pi_n')$ (e.g., $\pi_n=\pi_n'$). At 368, the staged mixture model $(p''(\cdot))$ is modified based, at least in part, upon the added mixture component $(p_n(\cdot))$, the associated mixture weight of the added component $(\pi_n)$ and the previous staged mixture model $(p^{n-1}(\cdot))$ (e.g., based on Eq. (3)). At 372, the second schedule counter $(C_2)$ is incremented and processing continues at 348.

If the determination at 360 is NO, at 376, a determination is made as to whether the third schedule counter $(C_3)$ is greater than a third schedule parameter (S3) or a third stopping criteria has been met. For example, the third stopping criteria can be based upon a difference between the model score for successive iterations (e.g., two) divided by the difference in model score at the current iteration and the initial model. If the value is below a specified value (e.g., by a user, for example $10^{-5}$), the third stopping criteria has been met. If the determination at 376 is NO, at 380, the third schedule counter $(C_3)$ is incremented and processing continues at 312. If the determination at 376 is YES, no further processing occurs.

In accordance with one aspect of the present invention, the precise schedule of the SEM algorithm is defined by the tuple $(S_1, S_2, S_3)$.

Figure 5:
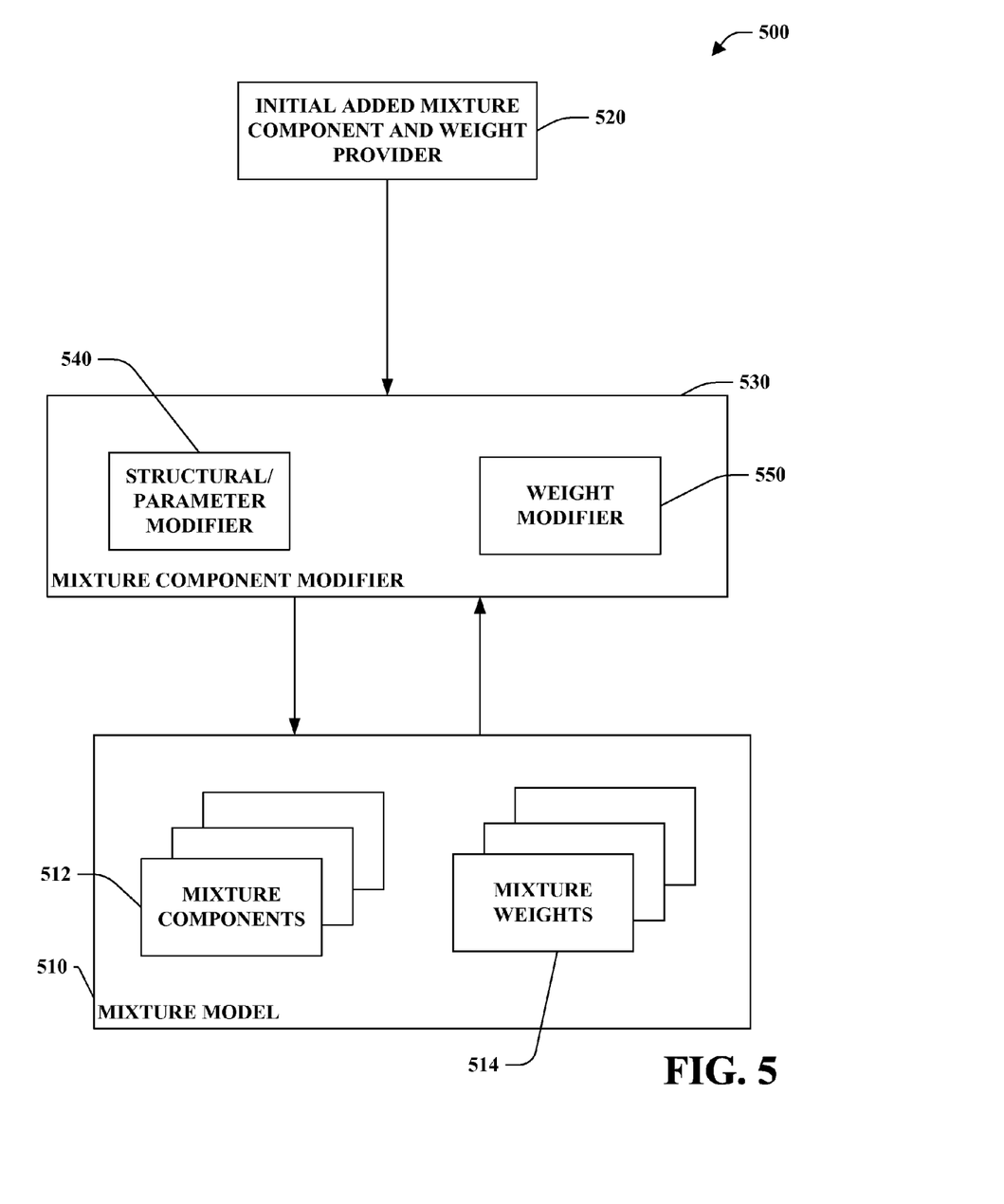
FIG. 5 is a block diagram of a staged mixture model system in accordance with an aspect of the present invention.

Turning next to FIG. 5, a staged mixture model generation system 500 in accordance with an aspect of the present invention. The system 500 includes a mixture model 510 having a plurality of mixture components 512 and associated mixture weights 514, an initial added mixture component and weight provider 520 and a mixture component modifier 530.

The system 500 employs a data-driven staged mixture modeling technique, for example, for building density, regression, and classification model(s). The basic approach is to add mixture component(s) and associated mixture weight(s) (e.g., sequentially) to the mixture model 510 $(p^{n-1}(\cdot))$ using a structural expectation maximization (SEM) algorithm.

More specifically, in one example, at each stage, an added mixture component $(p_n(\cdot))$ and associated weight $(\pi_n)$ is provided by the initial added mixture component and weight provider 520 to the mixture component modifier 530.

In one example, the mixture component modifier 530 fixes the previous component structures, parameters, and relative mixture weights and employs an SEM algorithm to modify the added component and associated mixture weight. Addition and/or modification of the added mixture component $(p_n(\cdot))$ and its associated mixture weight $(\pi_n)$ can facilitate fitting of the mixture model 510 to case(s) that are undesirably addressed by mixture components of the mixture model 510 $(p^{n-1}(\cdot))$.

In another example, the mixture component modifier 530, the previous mixture components and/or associated mixture weights are not fixed—thus facilitating backfitting of the previous mixture components and/or associated mixture weights.

The mixture component modifier 530 includes a structural/parameter modifier 540 and/or a weight modifier 550.

The mixture component modifier 530 can modify the mixture model 510 ($p''(\cdot)$) based, at least in part, upon the added mixture component ($p_n(\cdot)$) (e.g., having an initial structure and parameters), the associated mixture weight ($\pi_n$) of the added mixture component and a previous mixture model $p''^{-1}(\cdot)$ (e.g., utilizing Eq. 3).

The structural/parameter modifier 540 can modify the structure and/or parameters of the added mixture component ($p_n(\cdot)$) provided by the initial added mixture component and weight provider 520. The structural/parameter modifier 540 can compute a weighted data set for the added mixture component ($p_n(\cdot)$). The structural/parameter modifier 540 can use the weighted data set and a fractionally weighted-data learning method to learn a potential added mixture component ($p_n'(\cdot)$). The structural/parameter modifier 540 can then calculate a model score using the potential added component ($p_n'(\cdot)$) on the weighted data (e.g., using a model score method). If the model score using the potential added component ($p_n'(\cdot)$) improves over the model score using the added component ($p_n(\cdot)$) on complete data, the added component ($p_n(\cdot)$) can be modified based, at least in part, upon the potential added component ($p_n'(\cdot)$) (e.g., $p_n(\cdot)=p_n'$). The mixture model 510 ($p''(\cdot)$) can then be modified based, at least in part, upon the added mixture component ($p_n(\cdot)$), the associated mixture weight of the added component ($\pi_n$) and the previous mixture model ($p''^{-1}(\cdot)$) (e.g., based on Eq. (4)). The structural/parameter modifier 540 can iteratively perform structural/parameter modification a predetermined number of times (e.g., based on a first schedule parameter ($S_1$)) and/or until a stopping criteria has been met.

The weight modifier 550 can modify the associated weight of the added mixture component ($\pi_n$). The weight modifier 550 can compute a weighted data set for the added mixture component ($p_n(\cdot)$) using the staged mixture model ($p''(\cdot)$). The weight modifier 550 can perform a maximization step to obtain a potential associated weight for the added mixture component ($\pi_n'$). The weight modifier 550 can calculate the mixture model score using the potential associated weight for the added mixture component ($\pi_n'$) (e.g., using a model score method). If the model score improves with the potential associated weight for the added mixture component ($\pi_n'$) (e.g., on original data) over a model score for the previous staged mixture model ($p''^{-1}(\cdot)$) (e.g., on original data), the associated weight mixture for the added mixture component ($\pi_n$) can be modified based on the potential associated weight ($\pi_n'$) (e.g., $\pi_n=\pi_n'$). Further, the mixture model 510 ($p''(\cdot)$ can be modified based, at least in part, upon the added mixture component ($p_n(\cdot)$, the associated mixture weight of the added component ($\pi_n$) and the previous staged mixture model ($p''^{-1}(\cdot)$) (e.g., based on Eq. 3). The weight modifier 530 can iteratively perform weight modification a predetermined number of times (e.g., based on a second schedule parameter ($S_2$)) and/or until a stopping criteria has been met.

The mixture component modifier 530 can iteratively perform structural/parameter modification and weight modification a predetermined number of times (e.g., based on a third schedule parameter ($S_3$)) and/or until a stopping criteria has been met.

The system 500 can successively add component(s) and associated mixture weight(s) to the mixture model 510 via the initial added mixture component and weight provider 520 and the mixture component modifier 530, for example, until a stopping criteria has been met. In one example, the stopping criteria includes a user defined maximum number of components. In another example, the stopping criteria is based, at least in part, upon a determination of whether adding components improves the model significantly based on scores from the model score method. For instance, the system 500 can stop adding components when a non-positive slope is obtained for a regression line calculated for scores obtained for models that were constructed for a set of most recent iterations.

In one example, previous mixture components are backfitted by the structural/parameter modifier 540. In another example, associated mixture weights are backfitted by the weight modifier 550. When backfitting, the computed weighted data is based on substantially all n components.

For example, the following three backfitting strategies can be applied. First, mixture-weight backfitting in which we relax the restriction of fixed relative mixture weights for the weight modifier 550. That is, after structure/parameter have been learned by the structural/parameter modifier 540, the weight modifier 550 employs the EM algorithm to adjust all of the mixture weights—including the weights in $p''^{-1}$.

A second backfitting strategy is component backfitting in which the restriction of fixed mixture components in $p''^{-1}(\cdot)$ of the structural/parameter modifier 540 is relaxed. That is, after the mixture weight(s) have been learned by the weight modifier 550, the search algorithm of the structural/parameter modifier 540 is used to update (parametric, structural, or both) the mixture components in $p''^{-1}(\cdot)$ as well as updating the added mixture component.

A third backfitting strategy combines mixture-weight backfitting and component backfitting.

It is to be appreciated that the mixture model 510, the mixture components 512, the mixture weights 514, the initial added mixture component and weight provider 520, the mixture component modifier 530, the structural/parameter modifier 540 and/or the weight modifier 550 can be computer components as that term is defined herein.

Figure 6:
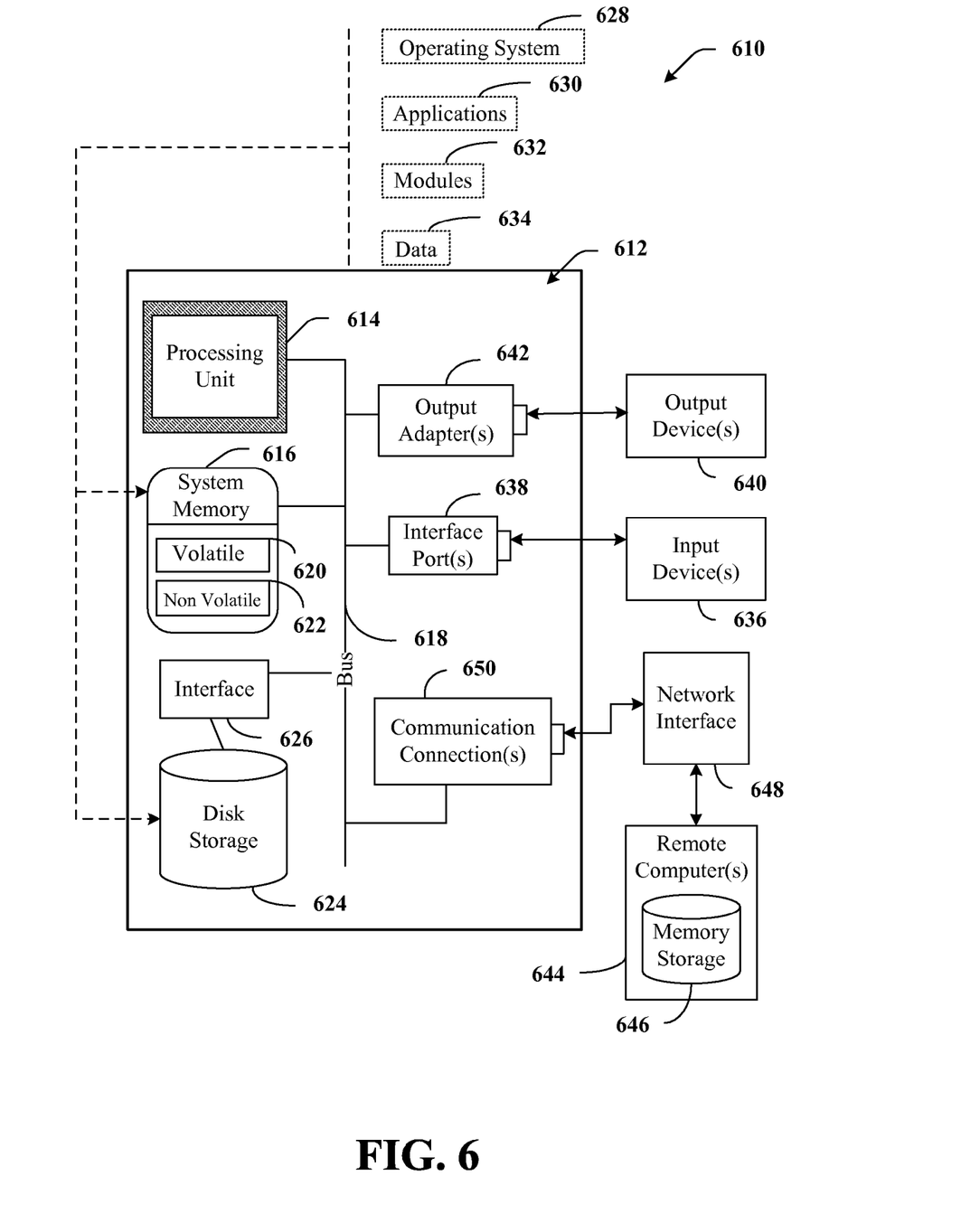
FIG. 6 illustrates an example operating environment in which the present invention may function.

In order to provide additional context for various aspects of the present invention, FIG. 6 and the following discussion are intended to provide a brief, general description of a suitable operating environment 610 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 610 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 6, an exemplary environment 610 for implementing various aspects of the invention includes a computer 612. The computer 612 includes a processing unit 614, a system memory 616, and a system bus 618. The system bus 618 couples system components including, but not limited to, the system memory 616 to the processing unit 614. The processing unit 614 can be any of various available processors. Dual microprocessors and other multiprocessor architectures also can be employed as the processing unit 614.

The system bus 618 can be any of several types of bus structure(s) including the memory bus or memory controller, a peripheral bus or external bus, and/or a local bus using any variety of available bus architectures including, but not limited to, 6-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 616 includes volatile memory 620 and nonvolatile memory 622. The basic input/output system (BIOS), containing the basic routines to transfer information between elements within the computer 612, such as during start-up, is stored in nonvolatile memory 622. By way of illustration, and not limitation, nonvolatile memory 622 can include read only memory (ROM), programmable ROM (PROM), electrically programmable ROM (EPROM), electrically erasable ROM (EEPROM), or flash memory. Volatile memory 620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 612 also includes removable/nonremovable, volatile/nonvolatile computer storage media. FIG. 6 illustrates, for example a disk storage 624. Disk storage 624 includes, but is not limited to, devices like a magnetic disk drive, floppy disk drive, tape drive, Jaz drive, Zip drive, LS-100 drive, flash memory card, or memory stick. In addition, disk storage 624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to the system bus 618, a removable or non-removable interface is typically used such as interface 626.

It is to be appreciated that FIG. 6 describes software that acts as an intermediary between users and the basic computer resources described in suitable operating environment 610. Such software includes an operating system 628. Operating system 628, which can be stored on disk storage 624, acts to control and allocate resources of the computer system 612. System applications 630 take advantage of the management of resources by operating system 628 through program modules 632 and program data 634 stored either in system memory 616 or on disk storage 624. It is to be appreciated that the present invention can be implemented with various operating systems or combinations of operating systems.

A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638. Interface port(s) 638 include, for example, a serial port, a parallel port, a game port, and a universal serial bus (USB). Output device(s) 640 use some of the same type of ports as input device(s) 636. Thus, for example, a USB port may be used to provide input to computer 612, and to output information from computer 612 to an output device 640. Output adapter 642 is provided to illustrate that there are some output devices 640 like monitors, speakers, and printers among other output devices 640 that require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a personal computer, a server, a router, a network PC, a workstation, a microprocessor based appliance, a peer device or other common network node and the like, and typically includes many or all of the elements described relative to computer 612. For purposes of brevity, only a memory storage device 646 is illustrated with remote computer(s) 644. Remote computer(s) 644 is logically connected to computer 612 through a network interface 648 and then physically connected via communication connection 650. Network interface 648 encompasses communication networks such as local-area networks (LAN) and wide-area networks (WAN). LAN technologies include Fiber Distributed Data Interface (FDDI), Copper Distributed Data Interface (CDDI), Ethernet/IEEE 602.3, Token Ring/IEEE 602.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 650 refers to the hardware/software employed to connect the network interface 648 to the bus 618. While communication connection 650 is shown for illustrative clarity inside computer 612, it can also be external to computer 612. The hardware/software necessary for connection to the network interface 648 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A staged mixture model for improved data mining, comprising:
   a plurality of mixture components each having an associated mixture weight;

an added mixture component having a structure, parameters and associated mixture weight, the added mixture component modified based upon at least one case that is undesirably addressed by the plurality of mixture components using a fractionally weighted-data learning method and a structural expectation maximization (SEM) algorithm to modify the structure, at least one of the parameters and associated mixture weight of the added mixture component; and a plurality of sequentially added mixture components, each added mixture component added to the staged mixture model and modified based upon at least one case that is undesirably addressed by the plurality of mixture components using a fractionally weighted-data learning method and a structural expectation maximization (SEM) algorithm to modify the structure, at least one of the parameters and associated mixture weight of the added mixture component.

2. The staged mixture model of claim 1, wherein a weighted data set for the added mixture component is computed using a current staged mixture model based on the case that is that is undesirably addressed by the plurality of mixture components.

3. The staged mixture model of claim 2, wherein a potential added mixture component is learnt using the weighted data set for the added mixture component and the fractionally weighted-data learning method.

4. The staged mixture model of claim 3, wherein a staged mixture model score is calculated for the potential added mixture component and another score calculated for the added mixture component.

5. The staged mixture model of claim 4, wherein a comparison between the model score for the added mixture component and the model score of the potential added mixture component is applied to determine if the potential added mixture component should replace the added mixture component.

6. The staged mixture model of claim 5, wherein the staged mixture model is modified based upon the added mixture component, the associated mixture weight of the added mixture component and the current staged mixture model.

7. The staged mixture model of claim 1, wherein at least one of the mixture components comprises a Bayesian network.

8. The staged mixture model of claim 1, wherein at least one of the mixture components comprises a decision tree with a bounded number of leaves.

9. The staged mixture model of claim 1, wherein at least one of the mixture components comprises a decision tree.

10. A density estimation model employing the staged mixture model of claim 1.

11. A classification model employing the staged mixture model of claim 1.

12. A regression model employing the staged mixture model of claim 1.

13. A staged mixture model generation system for improved data mining, comprising:

a current mixture model including a plurality of mixture components each having an associated mixture weight;

a mixture component and weight provider that provides an added mixture component having a structure, parameters and an associated mixture weight; and a mixture component modifier that modifies the added mixture component based upon at least one case that is undesirably addressed by the plurality of mixture components using a fractionally weighted-data learning method and a structural expectation maximization (SEM) algorithm to modify the structure, at least one of the parameters and associated mixture weight of the added mixture component.

14. The system of claim 13, wherein the mixture component modifier computes a weighted data set for the added mixture component using the current staged mixture model to determine at least one case that is undesirably addressed by the plurality of mixture components.

15. The system of claim 14, wherein the mixture component modifier further learns a potential added mixture component using a weighted data set for the added mixture component and a fractionally weighted-data learning method.

16. The system of claim 15, wherein the mixture component modifier calculates a staged mixture model score for the potential added mixture component and another score for the added mixture component.

17. The system of claim 16, wherein the mixture component modifier uses a comparison between the model score for the added mixture component and the model score of the potential added mixture component to determine if the potential added mixture component should replace the added mixture component.

18. The system of claim 17, wherein the mixture component modifier modifies the staged mixture model based upon the added mixture component, the associated mixture weight of the added mixture component and the current staged mixture model.

19. The system of claim 13, wherein at least one of the mixture components comprises a Bayesian network.

20. The system of claim 13, wherein at least one of the mixture components comprises a decision tree with a bounded number of leaves.

21. The system of claim 13, wherein at least one of the mixture components comprises a decision tree.

22. A method for learning a staged mixture model for improved data mining, comprising:

loading a plurality of mixture components each having an associated mixture weight into a mixture model;

sequentially adding mixture components to the mixture model, the mixture components having a structure, parameters and associated mixture weights, and corresponding to cases that are undesirably addressed by existing mixture components of the mixture model; and, employing a fractionally weighted-data learning method and a structural expectation maximization (SEM) algorithm to modify the structure, parameters and the associated mixture weights of the added mixture components.

23. A method for generating a staged mixture model for improved data mining, comprising:

loading a plurality of mixture components each having an associated mixture weight into a mixture model;

adding a mixture component having a structure, parameters and associated mixture weight;

modifying at least one of the structure and parameters of the added mixture component based upon a fractionally weighted-data learning method; and, modifying the associated mixture weight of the added mixture component based upon a structural expectation maximization (SEM) algorithm.

24. A method for learning a staged mixture model for improved data mining, comprising:

loading a plurality of mixture components each having an associated mixture weight;

computing a weighted data set for the added mixture component using a current staged mixture model to determine at least one case that is undesirably addressed by the plurality of mixture components;

learning a potential added component based upon a fractionally weighted-data learning method;

calculating a model score associated with the potential added component and the added mixture component; and, modifying the added mixture component based upon the potential added component, if the model score of the potential added component is greater than the model score of the added mixture component; and modifying the staged mixture model based upon an added mixture component, the current staged mixture model and associated weight of the added mixture component.

25. The method of claim 24, further comprising at least one of the following steps:

computing a weighted data set for the added mixture component using the current staged mixture model; and, modifying the associated weight of the added mixture component using the weighted data set and a structural expectation maximization (SEM) algorithm.

26. A staged method for constructing a mixture model for improved data mining, comprising:

providing a plurality of mixture components each having an associated mixture weight;

sequentially adding at least one mixture component to the mixture model with a pre-specified structure, parameters and associated mixture weight, each added mixture component added to the mixture model based upon at least one case that is undesirably addressed by the plurality of mixture components; and, employing a fractionally weighted-data learning method and a structural expectation maximization (SEM) algorithm to modify the structure, at least one of the parameters and associated mixture weight of the added mixture component.

27. The method of claim 26, wherein the structure and parameters of at least one of the added mixture components in the mixture model is fixed.

28. The method of claim 27, wherein associated weights of the added mixture components of the mixture model is fixed.

29. The method of claim 26, wherein the parameters of at least one of the added mixture components of the mixture model is fixed.

30. The method of claim 29, wherein associated weights of the added mixture components of the mixture model is fixed.

31. The method of claim 26, wherein the mixture weight of at least one of the added mixture components in the mixture model is fixed.

32. A method for learning a staged mixture model for improved data mining, comprising:

providing a plurality of mixture components each having an associated mixture weight;

adding a mixture component having a structure, parameters and associated mixture weight;

modifying at least one of the structure and the parameters of the added mixture component based upon a fractionally weighted-data learning method; and, modifying the associated mixture weight of the added mixture component using a structural expectation maximization (SEM) algorithm.

33. A computer implemented signal for a staged mixture model generation system, comprising the following computer executable components:

a mixture model component having at least one added mixture component, the at least one added mixture component having a structure, parameters and associated mixture weight, and modified based upon at least one case that was undesirably addressed by a plurality of mixture components;

the computer implemented signal using a fractionally weighted-data learning method and a structural expectation maximization (SEM) algorithm to modify the structure, at least one of the parameters and associated mixture weight of the at least one added mixture component.

34. A computer readable medium storing computer executable instructions of a staged mixture model, comprising:

a plurality of mixture components each having a structure, parameters and associated mixture weight; and, at least one added mixture component having been modified based upon at least one case that is undesirably addressed by the plurality of mixture components and using a fractionally weighted-data learning method and a structural expectation maximization (SEM) algorithm to modify the structure, at least one of the parameters and associated mixture weight of the at least one added mixture component.

35. A staged mixture model generation system for improved data mining, comprising:

means for providing a plurality of mixture components each having an associated mixture weight;

means for providing an added mixture component to the staged mixture model, the added mixture component having a structure, parameters and associated mixture weight;

means for modifying the added mixture component based upon at least one case that is undesirably addressed by a plurality of mixture components and using a fractionally weighted-data learning method and a structural expectation maximization (SEM) algorithm to modify the structure, at least one of the parameters and associated mixture weight of the added mixture component.

* * * * *